United States Patent
Park et al.

(10) Patent No.: US 9,186,978 B2
(45) Date of Patent: Nov. 17, 2015

(54) HYBRID TRANSMISSION FOR VEHICLE

(71) Applicant: Hyundai Motor Company, Seoul (KR)

(72) Inventors: Jong Yun Park, Hwaseong-si (KR); Eui Cheol Chung, Seoul (KR); Jae Young Choi, Busan (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/326,305

(22) Filed: Jul. 8, 2014

(65) Prior Publication Data

US 2015/0165894 A1  Jun. 18, 2015

(30) Foreign Application Priority Data

Dec. 13, 2013  (KR) .................. 10-2013-0155323

(51) Int. Cl.
*F16H 3/72* (2006.01)
*B60K 6/547* (2007.10)

(52) U.S. Cl.
CPC .............. *B60K 6/547* (2013.01); *Y10S 903/902* (2013.01)

(58) Field of Classification Search
CPC ...................................................... B60K 6/547
USPC ........................ 475/5, 207, 8, 221, 317, 323
See application file for complete search history.

(56) References Cited

U.S. PATENT DOCUMENTS

| | | | |
|---|---|---|---|
| 8,075,436 B2 * | 12/2011 | Bachmann .......................... | 475/5 |
| 8,197,373 B2 * | 6/2012 | Akutsu et al. ...................... | 475/5 |
| 8,517,876 B2 * | 8/2013 | Sakai et al. ........................ | 475/5 |
| 8,585,522 B2 * | 11/2013 | Kaltenbach et al. ............... | 475/5 |
| 8,622,862 B2 * | 1/2014 | Koyama et al. .................... | 475/5 |
| 8,747,265 B2 * | 6/2014 | Onomura et al. .................. | 475/5 |
| 8,790,202 B2 * | 7/2014 | Sakai et al. ........................ | 475/5 |
| 8,827,852 B2 * | 9/2014 | Ikegami ............................. | 475/5 |
| 2013/0324341 A1 * | 12/2013 | Cho et al. ........................... | 475/5 |

FOREIGN PATENT DOCUMENTS

| | | |
|---|---|---|
| JP | 2007-186199 A | 7/2007 |
| JP | 2010-285012 A | 12/2010 |
| KE | 2000-272360 A | 10/2000 |
| KR | 100293543 B1 | 4/2001 |
| KR | 1020070021558 A | 2/2007 |
| KR | 100726734 B1 | 6/2007 |
| KR | 1020080058388 A | 6/2008 |

* cited by examiner

*Primary Examiner* — David J Hlavka
(74) *Attorney, Agent, or Firm* — Morgan, Lewis & Bockius LLP

(57) ABSTRACT

A hybrid transmission for a vehicle may include a first input shaft receiving power from an engine through a first clutch, a second input shaft disposed parallel to the first input shaft and receiving power from the engine through a path different from that of the first input shaft, a power control unit selectively transmitting the power of the first input shaft to the second input shaft, an output shaft disposed parallel to the first input shaft and the second input shaft, a common shift module including a plurality of shift gears and synchronous apparatuses to form any one shift stage, a motor connected to the first input shaft, and a planetary gear set having rotary elements connected to one shift gear on the first input shaft and the second input shaft, respectively, and another rotary element capable of changing a fixed state.

6 Claims, 8 Drawing Sheets

HYBRID TRANSMISSION FOR VEHICLE

CROSS-REFERENCE TO RELATED APPLICATION

The present application claims priority of Korean Patent Application Number 10-2013-0155323 filed on Dec. 13, 2013, the entire contents of which application are incorporated herein for all purposes by this reference.

BACKGROUND OF INVENTION

1. Field of Invention

The present invention relates to a hybrid transmission for a vehicle, and more particularly, to the structure of a transmission which provides a driving force using the power from an engine and a motor.

2. Description of Related Art

Automotive hybrid transmissions need to be able to combine power from an engine and a motor and supply the power to driving wheels appropriately for vehicles traveling.

Further, the hybrid transmissions need to be light and compact with as small number of parts as possible to reduce the manufacturing cost, improve fuel efficiency of vehicles, and make it easy to mount them on vehicles. Further, it is preferable that the hybrid transmissions can implement transmission modes as various as possible while being light and compact with relatively a small number of parts.

In order to achieve a hybrid power train based on a dual clutch transmission (DCT) structure having two clutches and two corresponding input shafts, when a motor is connected to any one of the input shafts, hybrid transmission are configured to be able to implement an EV mode in which only the shift gears on the input shafts connected with the motor, for example, only the odd-numbered shift gears are driven by the motor.

However, when the shift gears on the other input shaft is enabled to be driven in the EV mode even with one motor connected to any one input shaft, shifting can be more freely controlled while a vehicle travels, so it can contribute to improving traveling performance and fuel efficiency of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a hybrid transmission for a vehicle which can be easily mounted on a vehicle, contributes to reducing the manufacturing cost and improving fuel efficiency, has relatively many available shift gears, and achieves an EV mode in which a motor is connected to one input shaft and all the shift gears are driven by the motor.

An aspect of the present invention provides a hybrid transmission for a vehicle, which includes: a first input shaft that receives power inputted from an engine through a first clutch; a second input shaft that is disposed in parallel with the first input shaft and receives power from the engine through a path different from that of the first input shaft; a power control unit that can selectively transmit the power of the first input shaft to the second input shaft; an output shaft that is disposed in parallel with the first input shaft and the second input shaft; a common shift module configured to include a plurality of shift gears which are disposed at the first input shaft and/or the second input shaft to externally abut to a plurality of gears mounted at the output shaft in common and each forms one shift stage and a plurality of synchronous apparatuses which connects or disconnects each of the plurality of shift gears to or from the first input shaft or the second input shaft to form any one shift stage; a motor that is connected to the first input shaft; and a planetary gear set that has rotary elements connected to one shift gear on the first input shaft and the first input shaft, respectively, and the other rotary element capable of changing a fixed state.

According to the present invention, the hybrid transmission for a vehicle can be easily mounted on a vehicle, contributes to reducing the manufacturing cost and improving fuel efficiency, has relatively many available shift gears, and achieves an EV mode in which a motor is connected to one input shaft and all the shift gears are driven by the motor.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
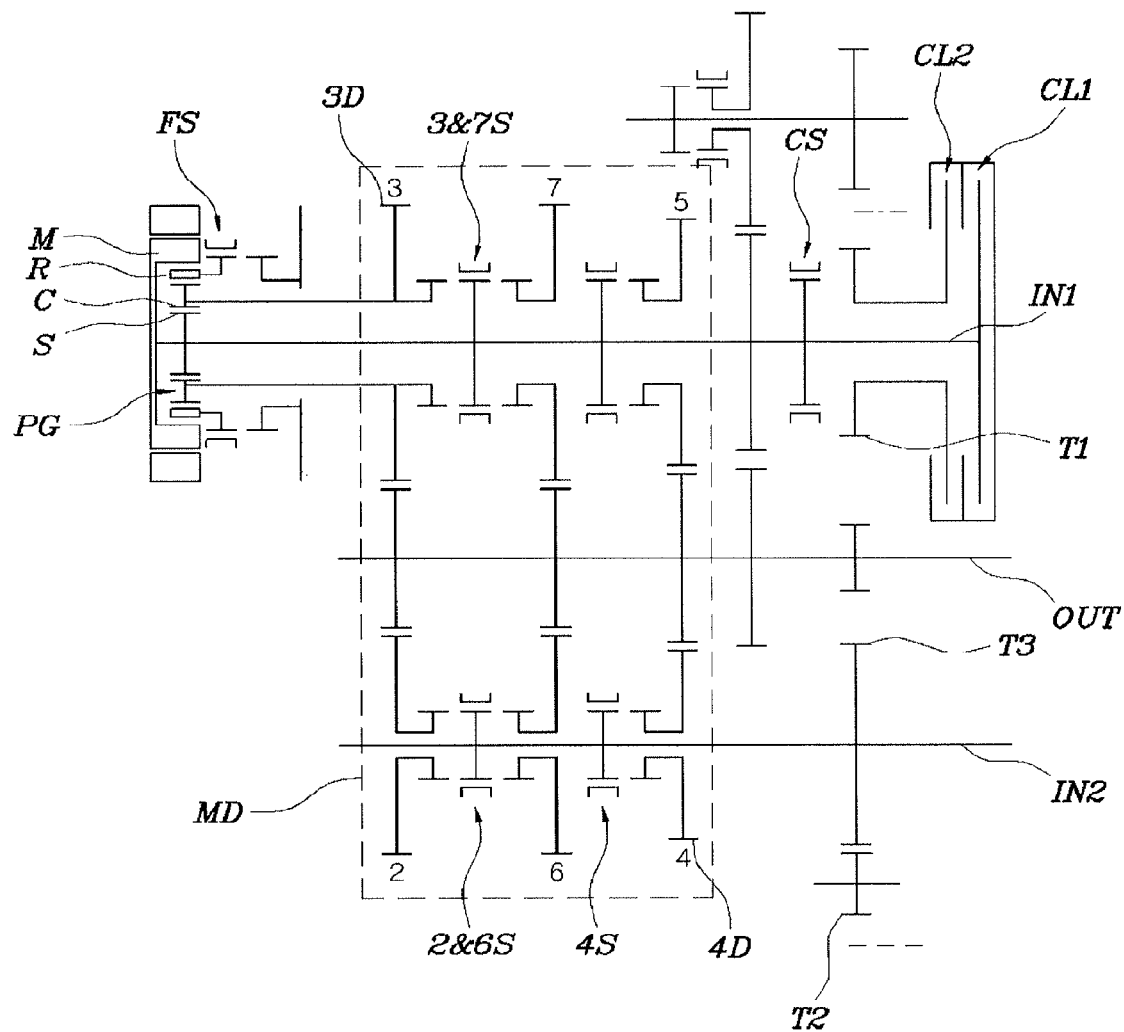
FIG. 1 is a diagram showing a configuration of an exemplary hybrid transmission for a vehicle according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a hybrid transmission for a vehicle of the present invention includes: a first input shaft IN1 that receives power inputted from an engine through a first clutch CL1; a second input shaft IN2 that is disposed parallel to the first input shaft IN1 and receives power from the engine through a path different from that of the first input shaft IN1; a power control unit that can selectively transmit the power of the first input shaft IN1 to the second input shaft IN2; an output shaft OUT that is disposed parallel to the first input shaft IN1 and the second input shaft IN2; a common shift module MD configured to include a plurality of shift gears which are disposed at the first input shaft IN1 and/or the second input shaft IN2 to externally abut to a plurality of gears mounted at the output shaft OUT in common and each forms one shift stage and a plurality of synchronous apparatuses which connects or disconnects each of the plurality of shift gears to or from the first input shaft IN1 or the second input shaft IN2 to form any one shift stage; a motor M that is connected to the first input shaft IN1; and a planetary gear set PG that has rotary elements connected to one shift gear on the first input shaft IN1 and the second input shaft IN2, respectively, and another rotary element that can change a fixed state.

That is, in various embodiments of the present invention, one shift gear is engaged with each of the first input shaft IN1 and the second input shaft IN2 for one gear on the output shaft OUT in the common shift module MD to make two different shift stages, so the number of gears can be reduced, as compared with when, generally, a pair of circumscribed gears makes one shift stage. Further, another shift stage can be further made by one shift gear on the first input shaft IN1 using the planetary gear set PG, so the numbers of shafts and parts can be reduced and relatively many shift stages can be made; therefore, a transmission that is light, compact and can be easily mounted can be provided and it can considerably contribute to improving fuel efficiency of a vehicle.

The second input shaft IN2 receives power from the engine through a first transmission gear T1 disposed coaxially with the first input shaft IN1, receiving the power from the engine through the second clutch CL2, a second transmission gear T2 being in mesh with the first transmission gear T1, and a third transmission gear T3 being in mesh with the second transmission gear T2 and integrally fitted on the second input shaft IN2.

The power control unit is implemented by a center synchronous apparatus CS that is a synchro-mechanism disposed on the first input shaft IN1 and engaged with/disengaged from the first transmission gear T1.

Accordingly, when the first input shaft IN1 is connected to the first transmission gear T1 by the center synchronous apparatus CS without the second clutch CL2 engaged, the power of the first input shaft IN1 is transmitted to the second input shaft IN2 through the first transmission gear T1, the second transmission gear T2, and the third transmission gear T3, so the second input shaft IN2 operates simultaneously with the first input shaft IN1.

When the first input shaft IN1 is driven by the motor M and any one of the shift stages between the first input shaft IN2 and the output OUT is selected, traveling at the shift stage in the EV mode becomes possible.

In some embodiments, the odd-numbered shift stages of a series of shift stages are disposed between the first input shaft IN1 and the output shaft OUT and the even-numbered shift stages of the series of shift stages are disposed between the second input shaft IN2 and the output shaft OUT.

In the planetary gear set PG, a sun gear S is connected to the first input shaft IN1, a carrier C is connected to the third shift gear, and a ring gear R can be fixed, in which the ring gear R of the planetary gear set PG can be fixed by a fixing synchronous apparatus FS that is a synchro-mechanism.

Figure 2:
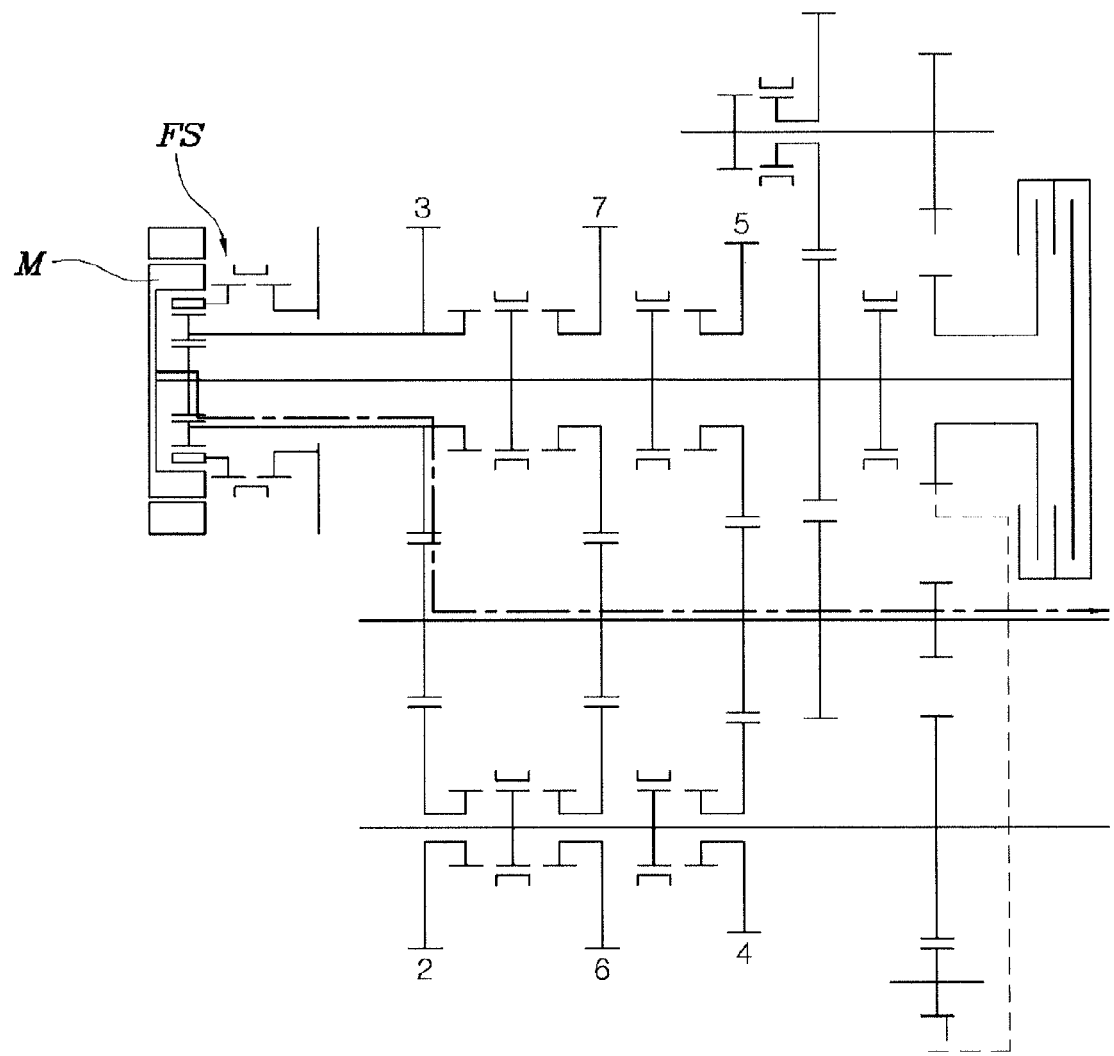
FIG. 2 is a diagram illustrating that the first gear is engaged in an EV mode in the configuration of FIG. 1.

The third shift gear is used for implementing the first shift stage too. In the state of FIG. 2, when the ring gear R of the planetary gear set PG is fixed by the fixing synchronous apparatus FS, the torque of the sun gear S integrally fitted on the first input shaft IN1 is reduced by the carrier C and drives the third shift gear 3D, so the first shift stage is outputted to the output shaft OUT. Further, when the ring gear R is disengaged, power is not provided to the third shift gear 3D through the planetary gear set PG, so the third shift stage is implemented by connecting the third shift gear 3D to the first input shaft IN1, using the 3&7 synchronous apparatus 3&7S.

The other shift stages may be implemented in the same or similar way as common DCTs of the related art, by engaging the synchronous apparatus of a corresponding shift stage and engaging the clutch of the corresponding shift stage, so the detailed description is not provided and EV modes that are achieved by the present invention will be described hereafter.

FIG. 2 is a diagram illustrating that the first gear is engaged in an EV mode driven by the motor M, in which, as described above, when the motor M is driven with the ring gear R fixed by the fixing synchronous apparatus FS, the torque of the sun gear S is reduced by the carrier C and the third shift gear 3D is driven, so that the power of the first gear is outputted to the output shaft OUT, in which the 3&7 synchronous apparatus 3&7S is in the neutral stage.

Figure 3:
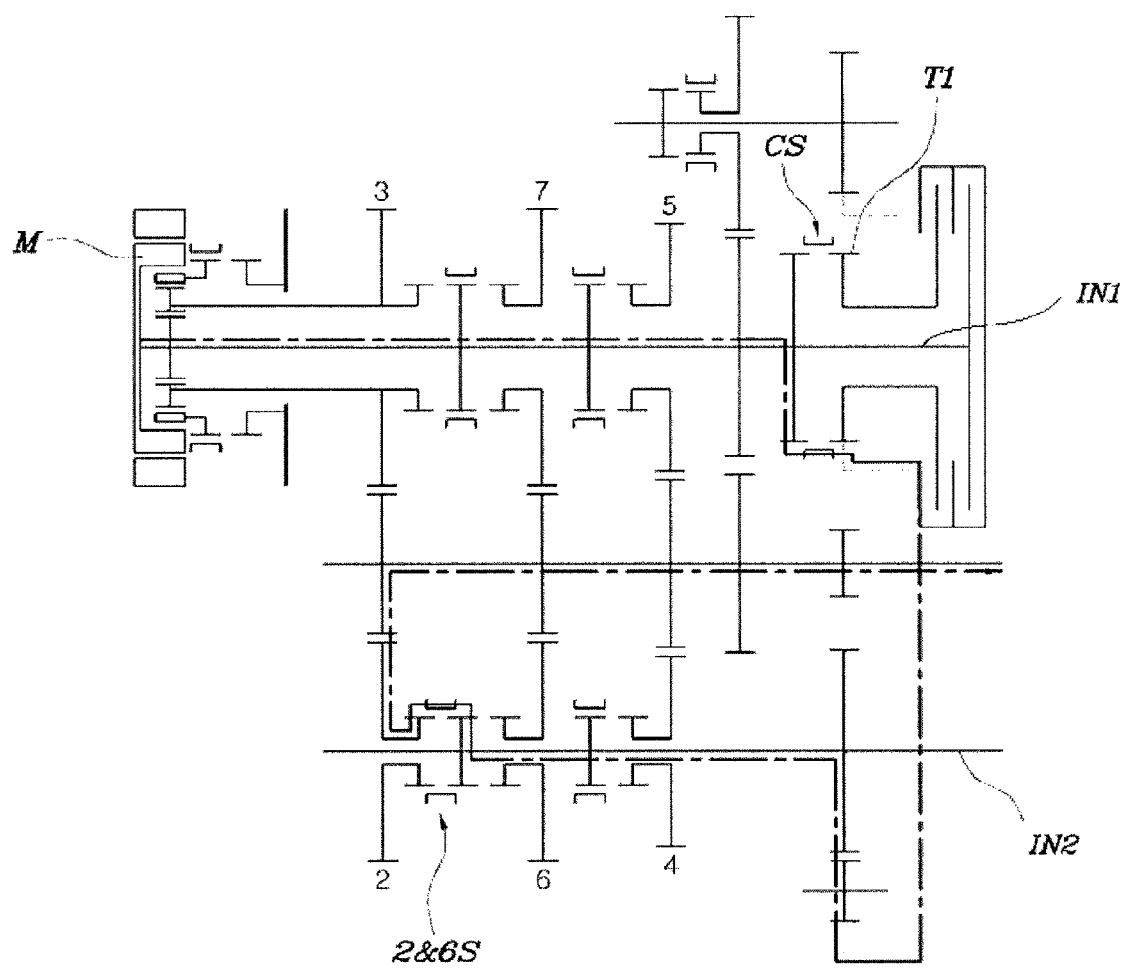
FIG. 3 is a diagram illustrating that the second gear is engaged in an EV mode in the configuration of FIG. 1.
Figure 4A:
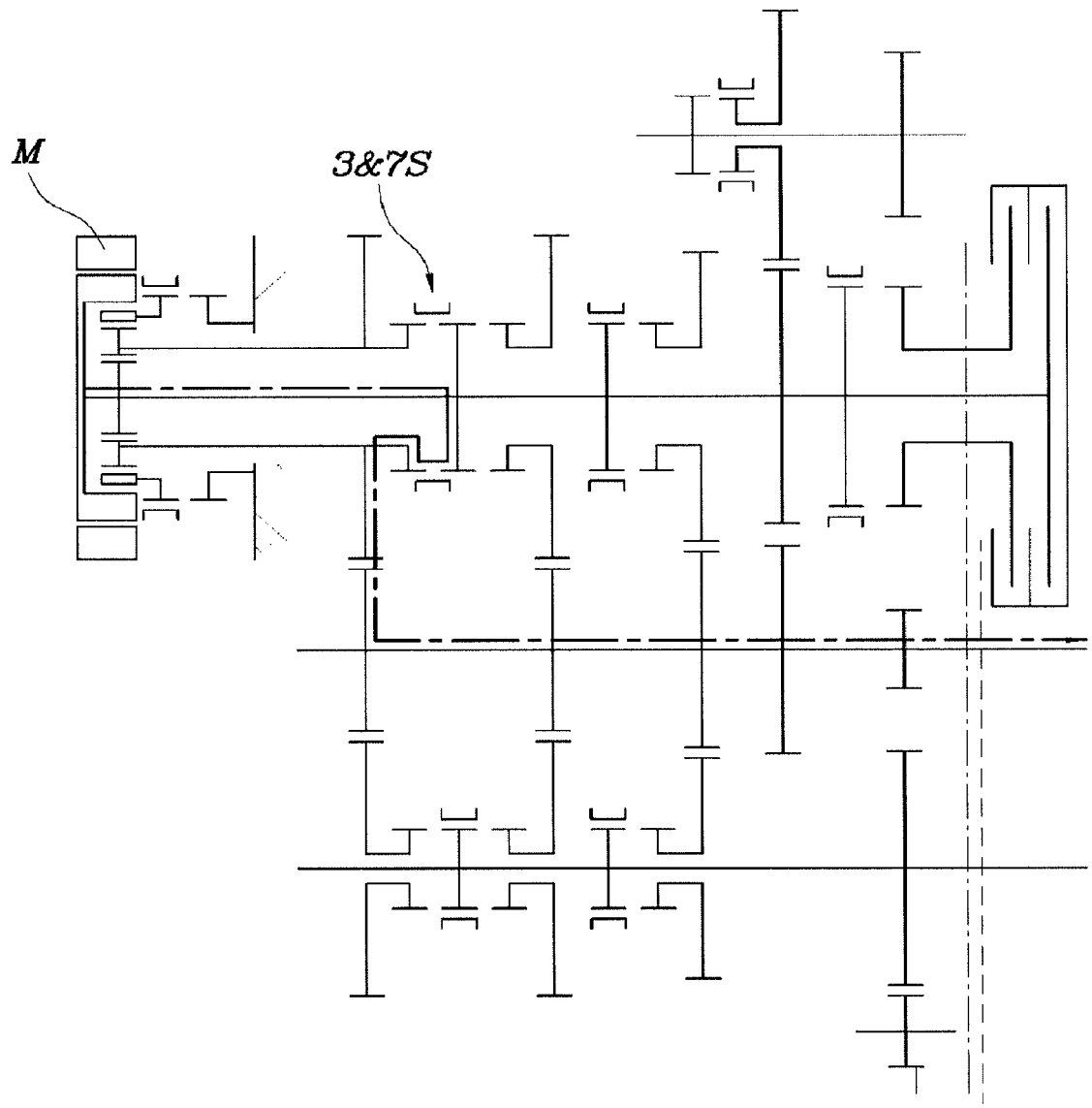
FIGS. 4A-4E are diagrams illustrating the process of shifting from the third gear in an EV mode to the fourth gear in an EV mode, in the configuration of FIG. 1.
Figure 4B:
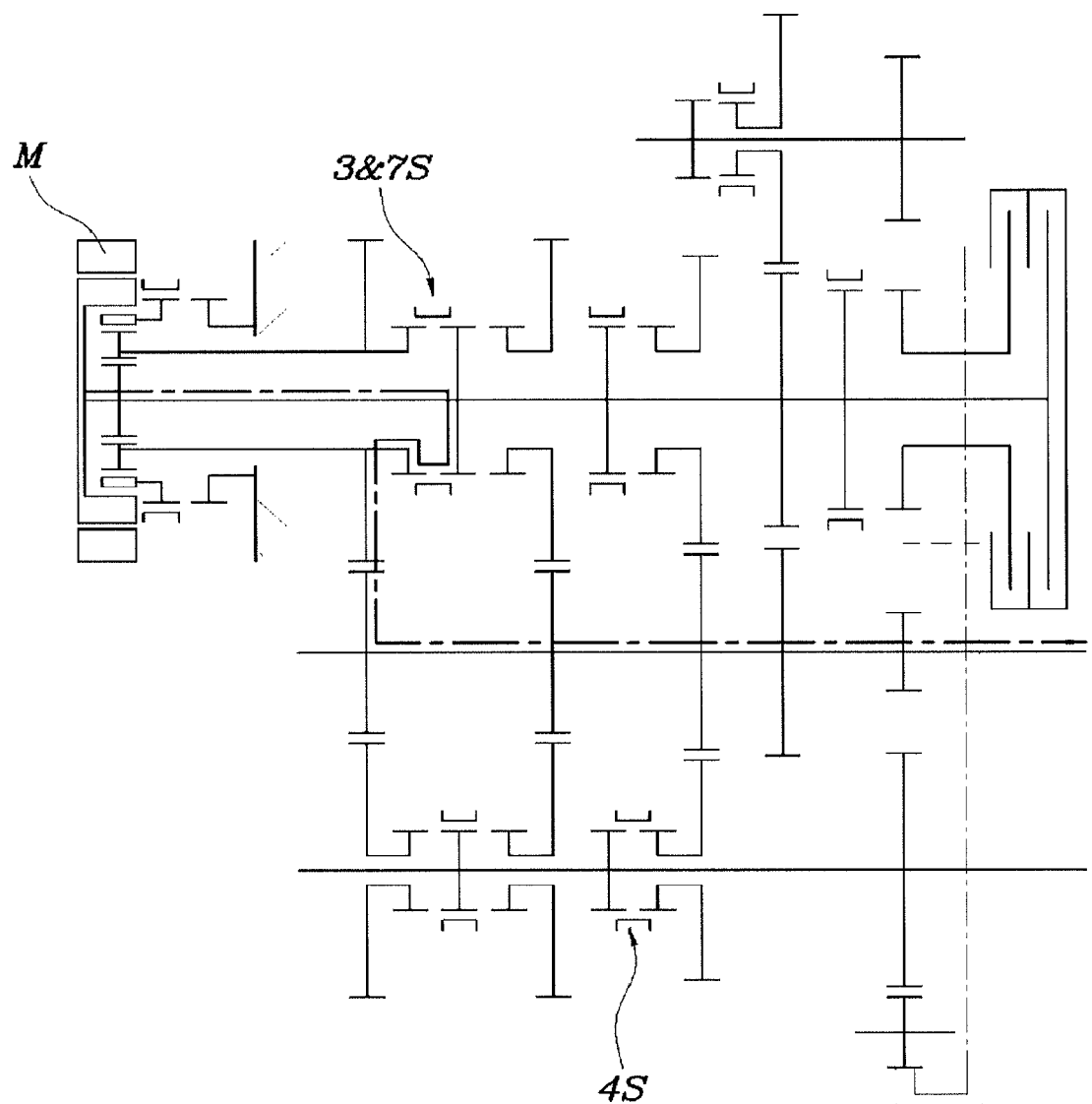
Figure 4C:
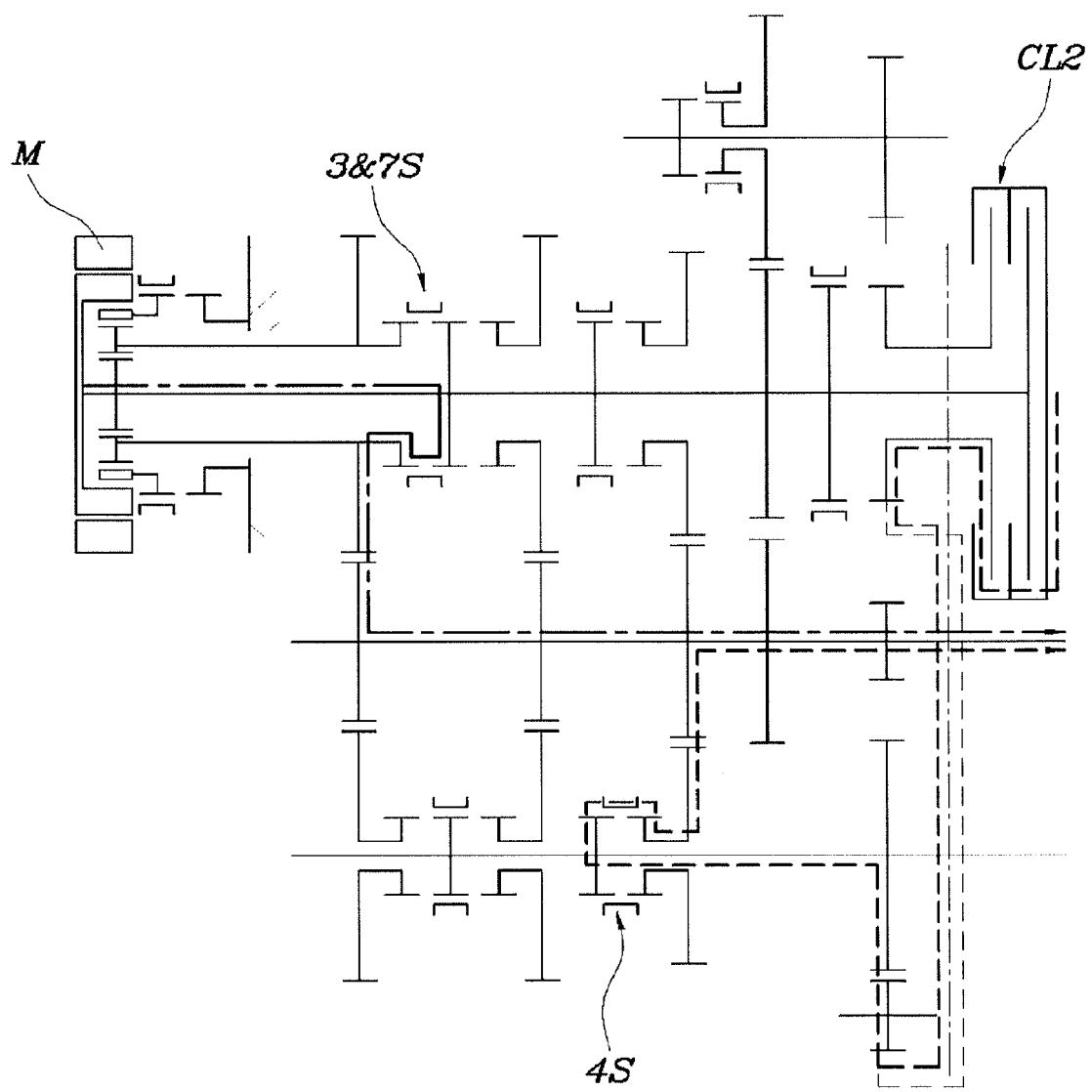
Figure 4D:
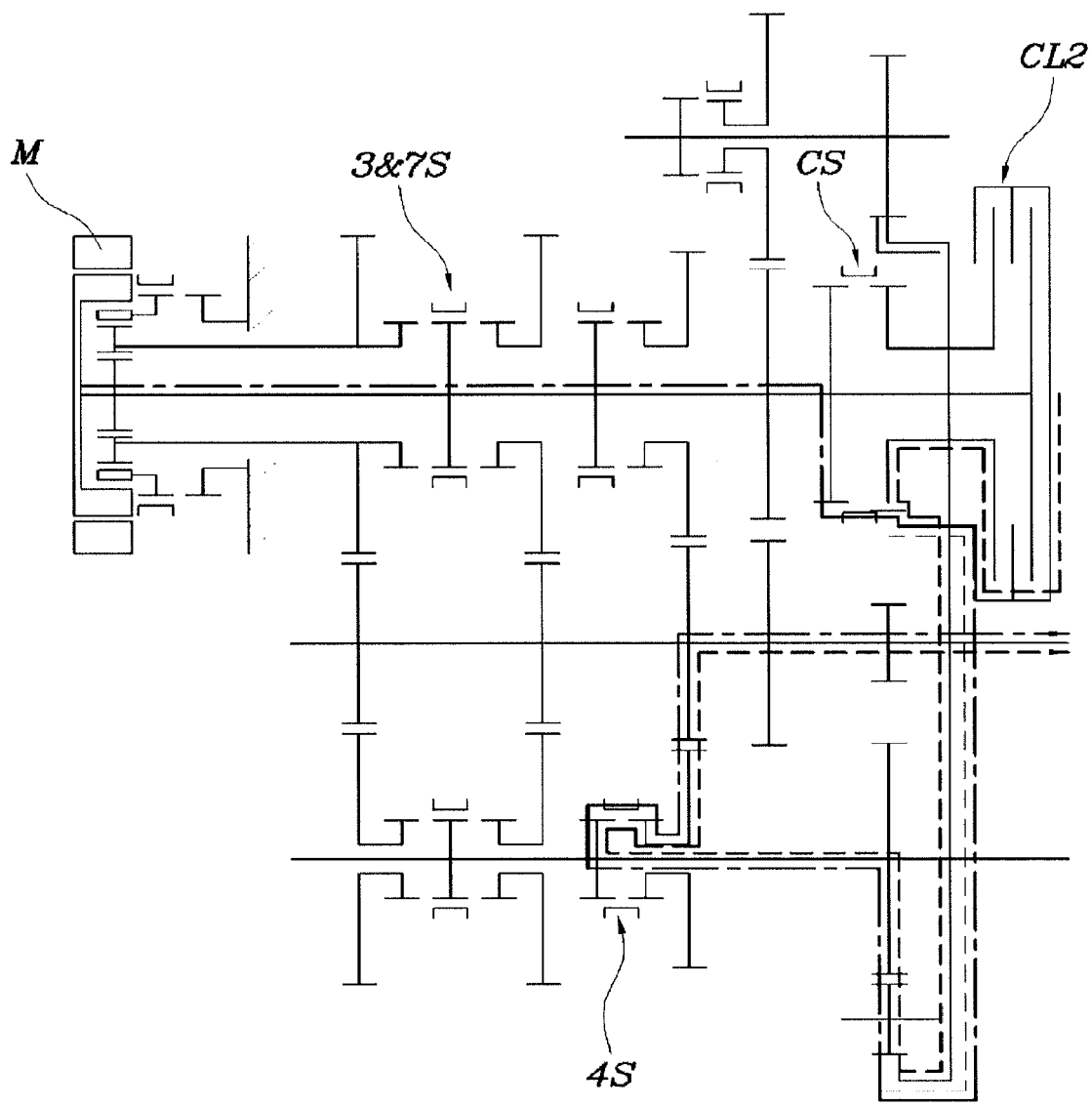
Figure 4E:
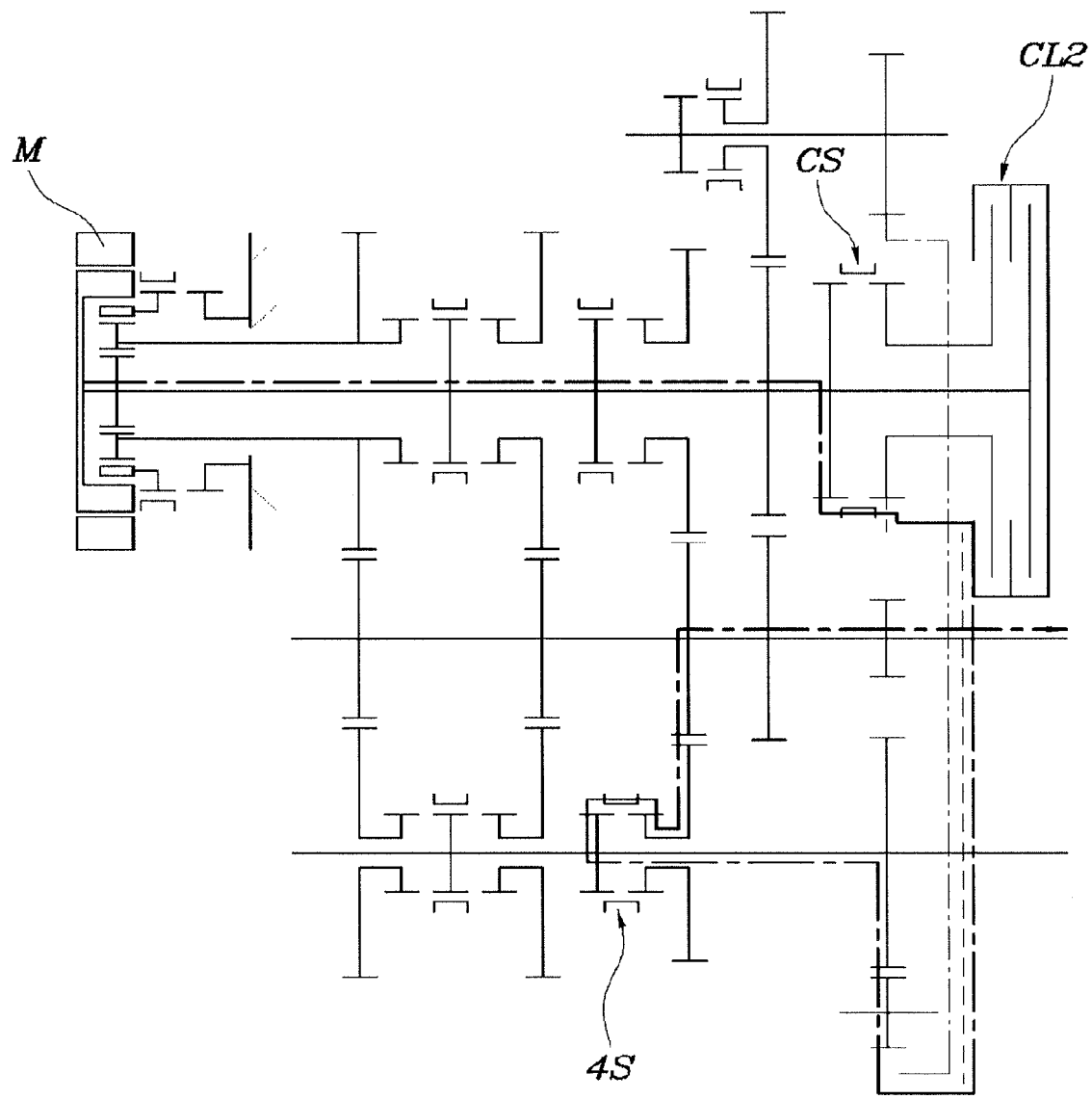

FIG. 3 is a diagram illustrating that the second gear is engaged in an EV mode driven by the motor M, in which the first input shaft IN1 is connected to the first transmission gear T1 by the center synchronous apparatus CS, so the driving force of the motor M is transmitted to the second input shaft IN2, and the second driving gear is connected with the second input shaft IN2 by a 2&6 synchronous apparatus 2&6S, so the power of the second gear is outputted to the output shaft OUT.

FIGS. 4A-4E are diagrams illustrating the process of shifting from the third gear in an EV mode to the fourth gear in an EV mode, which can be applied in the same or similar way to other shift stages.

The state 4A is the case with the third gear engaged in an EV mode, in which as the motor M drives the first input shaft IN1 with the third shift gear 3D connected to the first input shaft IN1 by the 3&7 synchronous apparatus 3&7S, the power of the third gear is outputted to the output shaft OUT.

In the state 4B, the fourth shift gear 4D is connected to the second input shaft IN2 by a fourth synchronous apparatus 4S, with the state A kept.

In the state 4C, the second clutch CL2 is engaged so that the power of the engine is transmitted to the second input shaft IN2 through the first transmission gear T1, the second transmission gear T2, and the third transmission gear T3, so both of the third gear power from the motor M and the fourth gear power from the engine are transmitted to the output shaft OUT.

In the state 4D, the third shift gear 3D is disengaged by shifting the 3&7 synchronous apparatus 3&7S to the neutral stage and the speeds of the center synchronous apparatus CS and the first transmission gear T1 are synchronized by driving the motor M, and then the first input shaft IN1 is linked to the second input shaft IN2 by engaging the center synchronous apparatus CS.

In the state 4E, the second clutch CL2 is disengaged from the state D and power for traveling at the fourth gear is generated by the motor, so the fourth gear is engaged in the EV mode.

According to the control as described above, in shifting from the third gear to the fourth gear in an EV mode, torque is continuously transmitted to the output shaft without cutting of torque, so shifting can be smoothly achieved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A hybrid transmission for a vehicle, comprising:
    a first input shaft that receives power inputted from an engine through a first clutch;
    a second input shaft that is disposed parallel to the first input shaft and receives power from the engine through a path different from that of the first input shaft and receives power from the engine through a second clutch;
    a power control unit that is mounted to the first input shaft and selectively transmits the power of the first input shaft to the second input shaft in a state that the second clutch is open;
    an output shaft that is disposed parallel to the first input shaft and the second input shaft;
    a common shift module configured to include a plurality of shift gears which are disposed at the first input shaft or the second input shaft to externally abut to a plurality of gears mounted at the output shaft and each forms one shift stage and a plurality of synchronous apparatuses which connects or disconnects each of the plurality of shift gears to or from the first input shaft or the second input shaft to form any one shift stage;
    a motor that is connected to the first input shaft; and
    a planetary gear set that has rotary elements connected to one shift gear on the first input shaft and the second input shaft, respectively, and another rotary element changing a fixed state.

2. The hybrid transmission of claim 1, wherein the second input shaft receives power from the engine through a first transmission gear disposed coaxially with the first input shaft, the second clutch, a second transmission gear being in mesh with the first transmission gear, and a third transmission gear being in mesh with the second transmission gear and integrally fitted on the second input shaft.

3. The hybrid transmission of claim 2, wherein the power control unit is implemented by a center synchronous apparatus that is a synchro-mechanism disposed on the first input shaft and engaged with or disengaged from the first transmission gear.

4. The hybrid transmission of claim 1, wherein odd-numbered shift stages of a series of shift stages are disposed between the first input shaft and the output shaft and even-numbered shift stages of the series of shift stages are disposed between the second input shaft and the output shaft.

5. The hybrid transmission of claim 4, wherein in the planetary gear set, a sun gear is connected to the first input shaft, a carrier is connected to the third shift gear, and a ring gear is fixed.

6. The hybrid transmission of claim 5, wherein the ring gear of the planetary gear set is fixed by a fixing synchronous apparatus that is a synchro-mechanism.

* * * * *